United States Patent [19]
Tracy

[11] Patent Number: 5,492,035
[45] Date of Patent: Feb. 20, 1996

[54] FLUID MANIFOLD FOR CENTER COLUMN MACHINE

[75] Inventor: James W. Tracy, Trenton, Mich.

[73] Assignee: Webco Machine Sales, Inc., Livonia, Mich.

[21] Appl. No.: 367,897

[22] Filed: Jan. 3, 1995

[51] Int. Cl.⁶ ................................................. B23Q 16/10
[52] U.S. Cl. .................. 74/813 C; 198/803.7; 137/625.21; 137/627
[58] Field of Search ............... 74/813 R, 813 L, 74/813 C, 815, 816, 821, 822; 198/470.1, 803.5, 803.7; 137/597, 625.11, 625.21, 627; 29/401.1

[56] References Cited

U.S. PATENT DOCUMENTS

| | | | |
|---|---|---|---|
| 2,821,158 | 1/1958 | Brown et al. | 198/803.5 |
| 2,833,164 | 5/1958 | Squiller | 74/821 |
| 4,380,939 | 4/1983 | Gardner | 74/813 L |
| 4,573,496 | 3/1986 | Richard | 137/625.21 |
| 5,261,451 | 11/1993 | Spencer | 137/625.21 |

Primary Examiner—Charles A. Marmor
Assistant Examiner—Chong H. Kim
Attorney, Agent, or Firm—Charles W. Chandler

[57] ABSTRACT

A center column machine assembly having a hydraulic manifold formed by a one-piece outer ring attached to the stationary part of the center column and a one-piece inner ring which is indexed with the work table. The two rings have overlapping surfaces defining an annular manifold passage around the column and between the two rings. The fixed ring has a port for receiving or discharging fluid under pressure, and an internal passage connecting the port to the annular manifold passage. The indexable inner ring has an outlet port suited for connection to a work fixture mounted on the work table. The indexable ring has an internal passage connecting the manifold passage to the outlet port so that the work fixture can be hydraulically actuated in a series of rotated work positions around the column.

8 Claims, 3 Drawing Sheets

1

FLUID MANIFOLD FOR CENTER COLUMN MACHINE

BACKGROUND OF THE INVENTION

This invention is related to a center column machine assembly having a pair of rings defining a hydraulic manifold for delivering fluid to a work fixture mounted on an indexable work table.

Center column machines are commonly employed for performing a sequence of metal-working operations on a workplace that is indexed on a work table around a center tool-supporting column. The workplace is mounted on a fixture on the work table. A group of work stations are mounted on the stationary center column and engage the workpiece as it is advanced between work stations. Such machines are rather substantial and conventionally employ mechanically-actuated fixtures and work stations. The center column is a generally cylindrical hollow body mounted in an upright position. The lower part of the center column is narrowed at the mounting base.

High pressure hydraulically-actuated fixtures commonly employ a pressure of 500–3,000 p.s.i. A hollow center manifold has not been commercially available which will accommodate such pressures for a center column machine because of its substantial size. Consequently, such fixtures have been limited to mechanically powered devices.

An example of a hydraulic rotary indexing table may be found in U.S. Pat. No. 4,380,939, issued Apr. 26, 1983 to Richard E. Gardner for "Rotary indexing Table". High pressure hydraulic, relatively small couplings are also well known in the art.

SUMMARY OF THE INVENTION

The broad purpose of the present invention is to provide a fluid manifold for a center column machine assembly.

The preferred embodiment of the invention employs a fluid manifold that can be incorporated on existing electrically-powered machines and comprises a pair of one-piece steel alloy manifold rings. One ring is attached to the enlarged stationary section of the center column with its lower edge overlapping the narrowed bottom of the column. A second, inner ring is mounted between the narrowed bottom of the column and the inside of the outer ring. The inner ring is indexed around the column with the work table and work fixtures.

The inner surface of the outer manifold ring has several annular manifold passages facing the inner ring and disposed entirely around the column. The outer manifold ring has a port for receiving a source of pressurized fluid, either air or hydraulic, and a shod passage connecting the inlet port to the annular manifold passage.

The inner manifold ring has an internal vertical passage for each of the work fixtures mounted on the work table. Internal passages connect the upper end of each vertical passage to the manifold passage, and the lower end to an outlet port which may be connected by a conduit to the work fixture. The outlet port is indexed with the movable manifold ring between the work stations. Seals are slidably mounted between the two manifold rings to seal the pressure in each manifold passage.

Such a manifold accommodates high hydraulic pressures, and can be employed in the severe use required of a center column machine.

2

Still further objects and advantages of the invention wilt become readily apparent to those skilled in the art to which the invention pertains upon reference to the following detailed description.

DESCRIPTION OF THE DRAWINGS

The description refers to the accompanying drawings in which like reference characters refer to like pads throughout the several views, and in which.

DESCRIPTION OF A PREFERRED EMBODIMENT

Figure 1:
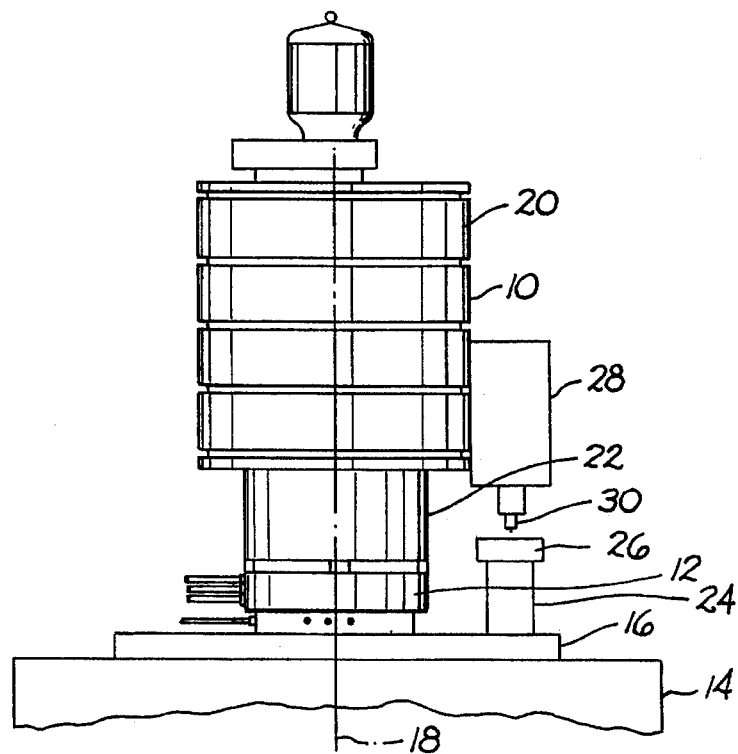
FIG. 1 illustrates a center column machine assembly with a hydraulic manifold illustrating the preferred embodiment of the invention.

Referring to FIG. 1, the preferred embodiment of the invention is described with reference to modifying an existing center column machine 10 by adding a hydraulic manifold 12. Machine 10 has a base 14, a rotary work table 16 that is indexed in the well-known manner about a vertical axis 18 that also forms the axis of a barrel-shaped center column 20 that is fixed with respect to base 14. The center column has a reduced lower section 22 that is also fixed with respect to the base.

Work table 16 is adapted to support several work fixtures, such as fixture 24 which supports a workpiece 26. Fixture 24 is hydraulically actuated by connection to a source of pressurized fluid and may take a variety of forms. A work station 28 is mounted on the column 20 in a fixed position and has a tool 30 that is raised and lowered toward the workpiece as it is indexed into a position beneath the work station.

Figure 2:
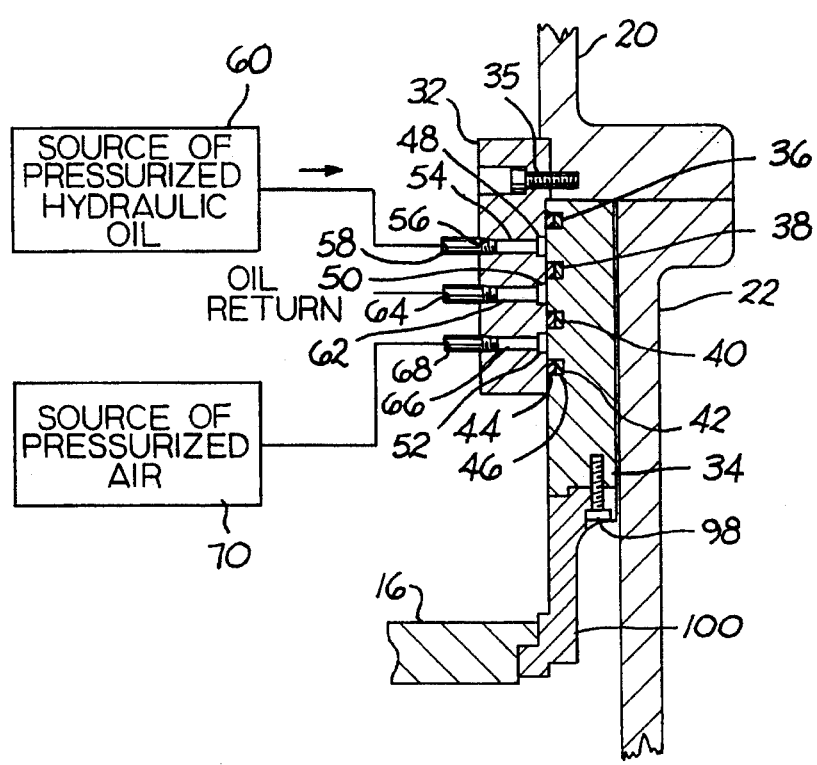
FIG. 2 is an enlarged sectional view of the hydraulic manifold at the location of the inlet ports.
Figure 6:
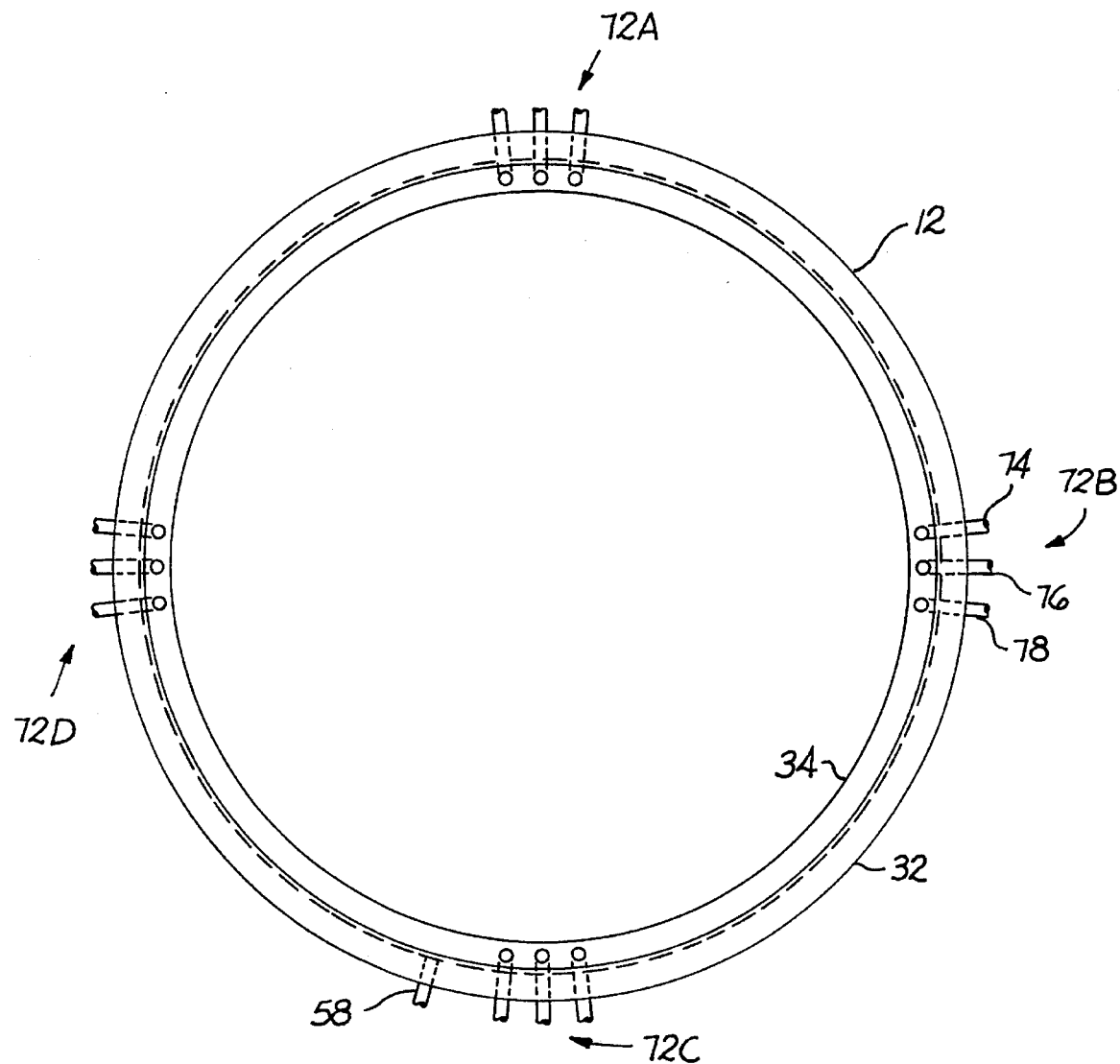
FIG. 6 is a plan view of the manifold separated from the center column.

Referring to FIGS. 2 and 6, manifold 12 comprises two, one-piece steel alloy rings (races) 32 and 34. Outer ring 32 has a uniform cross-section around its length. Referring to FIG. 2, threaded fastener means 35 attach the upper portion of ring 32 to the lower end of column 20. Fastener means 35 are located in a plurality of positions around the central column. FIG. 2 illustrates a typical attachment relationship.

The inner diameter of outer ring 32 is greater than the diameter of column lower section 22, and generally corresponds to the diameter of column 20.

The lower, inner ring 34 has a thickness generally corresponding to the distance between the inner surface of the outer ring and the outer surface of lower column section 22. The inner diameter of ring 32 is slightly greater than that of section 22 to permit the inner ring to rotate about column section 22.

Figure 7:
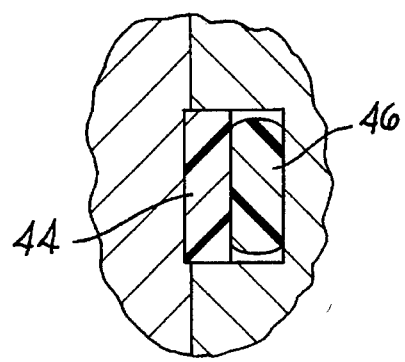
FIG. 7 is an enlarged cross section of a typical sealing groove.

The outer ring has a thickness of about 1" and a height of about 3.75". The inner ring has a height of about 6½" and a thickness of about 1¼". There is a sufficient clearance between the two rings to permit the inner ring to rotate with respect to the outer ring. The inner ring has four annular sealing grooves 36, 38, 40 and 42, spaced about ¾" apart. Each groove has a sealing ring 44 and an O-ring 46. Each sealing ring is formed of a PTFE (polytetraflora ethylene) low friction material. The O-rings are of a rubber resilient material as illustrated in FIG. 7. O-ring 46 biases the sealing ring toward the outer ring to keep the sealing ring in a sealing position, especially during lower fluid pressures.

Outer ring 32 has three annular manifold passages 48, 50 and 52. Each manifold passage is about 0.65" high with a radial depth of about 1/16". Each manifold passage extends completely around the Interior of the outer ring. Manifold passage 48 is disposed between sealing grooves 36 and 38. Manifold passage 50 is disposed between sealing grooves 38 and 40. Manifold passage 52 is disposed between sealing grooves 40 and 42.

The outer manifold ring has a shod radial passage 54 with an inlet port 56 connected by a conduit 58 to a source of pressurized hydraulic fluid 60. The inner end of passage 54 is in fluid communication with manifold passage 48. The outer manifold ring has a second radial passage 62 connected to a conduit 64 to provide a return passage for the hydraulic oil after It has been passed through a workpiece fixture to a return tank, not shown.

Outer ring 32 also has a third radial passage 66 connected to a conduit 68 which, in turn, is connected to a source of pressurized air 70. The inner end of passage 62 is fluidly connected to manifold passage 50. The inner end of passage 66 is fluidly connected to passage 52.

For illustrative purposes, inner lower ring 34 is indexed with the work table toward four locations. Accordingly, the work table has four fixtures, not shown, which are fluidly connected to the inner ring by conduit means 72A, 72B, 72C, and 72D at 90° intervals, as shown in FIG. 6. Each conduit means is identical except for its location on the inner ring.

Figure 5:
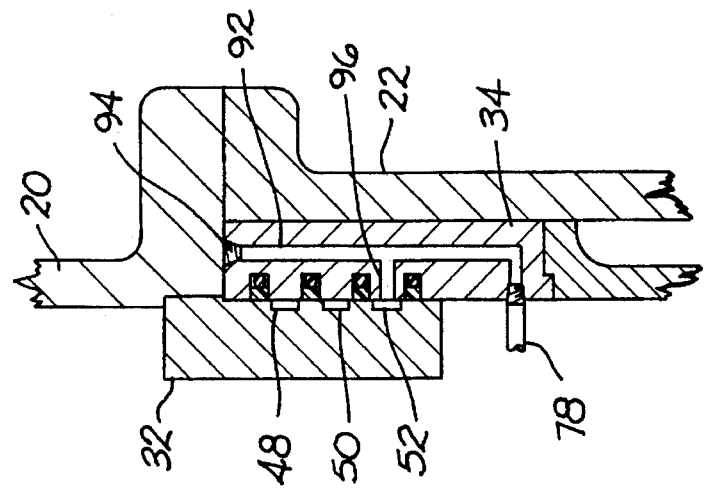
FIG. 5 is a view similar to FIG. 2, but showing a sectional view of the manifold at the location of a third outlet port.
Figure 4:
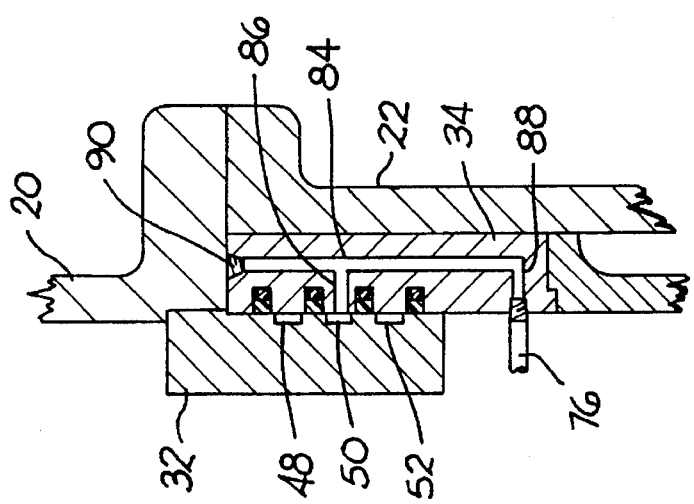
FIG. 4 is a view similar to FIG. 2, but showing a sectional view of the manifold at the location of another outlet port.
Figure 3:
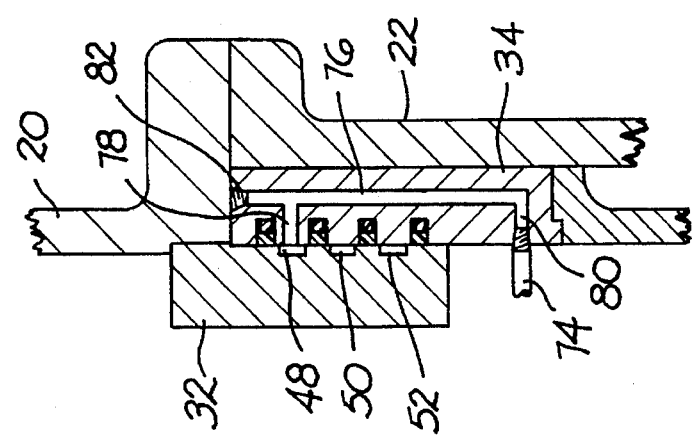
FIG. 3 is a sectional view similar to FIG. 2, but illustrating the manifold at the location of an outlet port.

Referring to FIGS. 3–5, each conduit means comprises three outlet conduits 74, 76, and 78. The conduits are all simultaneously connected to fixture 24 for either supplying or returning the hydraulic oil, or for supplying pressurized air under certain circumstances, for example, for blowing out the fixture workholding nests.

Referring to FIG. 3, inner ring 34 has an internal vertical passage 76 having its upper end connected to a shod internal passage 78 which in turn registers with annular manifold passage 48. The lower end of vertical passage 76 is connected to a short radial passage 80 which in turn is connected to conduit 74. The upper end of vertical passage 76 has a plug 82.

Referring to FIG. 4, lower ring 34 also has 8 second vertical passage 84 with a shod radial passage 86 fluidly connecting passage 84 to manifold passage 50. Shod radial passage 88 fluidly connects the lower end of vertical passage 84 to conduit 76 preferably by a threaded coupling. Plug 90 blocks the upper end of vertical passage 84.

The lower ring also has a third vertical passage 92 having its lower end connected by means of a threaded coupling to conduit 78. Plug 94 blocks the upper end of vertical passage 92. A short internal passage 96 connects vertical passage 92 to annular manifold passage 52.

The inner ring is joined by means of fastener means 98 to a support 100 attached to work table 16 in such a manner that as work table 16 is indexed around the center column, the inner ring advances with the work fixtures. The internal passages of the inner ring are always fluidly connected under the same fluid pressure existing in manifold passages 48, 50 and 52. The seals between each of the manifold passages carried by the inner ring insure that the manifold passages retain a substantial hydraulic pressure of several thousand p.s.i. A greater or lesser number of work stations can be used on the column simply by exchanging the inner ring with another ring having a greater or a lesser number of internal passages connected to the appropriate number of work fixtures.

Having described my invention, I claim:

1. In a center column machine having a base with a center column for mounting a work station having a tool, an annular work table for supporting a workpiece for rotation about the center column to an indexed position beneath the work station, the improvement comprising:

a one-piece annular first manifold ring mounted on the base around the center column, and means connecting the first manifold ring to the work table such that the work table and the first manifold ring are indexed together about the center column;

an annular second manifold ring attached to and around the center column so as to be fixed thereto, and overlapping the first manifold ring, means forming an annular fluid manifold passage between the first manifold ring and the second manifold ring for passing a fluid under pressure in the manifold passage about the center column;

the first ring having an outlet port and internal passage means fluidly connecting the manifold passage to said outlet port; and the second ring having an inlet port and internal passage means fluidly connecting the manifold passage to the inlet port, the inlet port in the second ring being adapted for connection to a source of pressurized fluid, and the outlet port in the first ring being adapted for connection to a work piece fixture mounted on the work table for receiving fluid from the source of pressurized fluid.

2. The improvement as defined in claim 1, in which the second ring has a plurality of outlet ports, each adapted to pass fluid from the manifold passage regardless of the rotated position of the second ring with respect to the first ring.

3. The improvement as defined in claim 1, in which the first ring and the second ring are detachably connected to the machine.

4. The improvement as defined in claim 1, in which the first ring and the second ring are mounted on the outside of the center column.

5. The improvement as defined in claim 1, in which the second ring has a plurality of manifold passages disposed about the center column, and the first ring has a plurality of outlet ports and a plurality of internal passages fluidly connecting the manifold passages to the outlet ports.

6. The improvement as defined in claim 1, in which the second manifold ring is a one-piece ring.

7. The improvement as defined in claim 1, in which the first manifold ring is telescopically received in the second manifold ring.

8. A method for altering an existing center column machine for using a hydraulically-actuated fixture, the machine having a base with a center column for mounting a work station having a tool, and an annular work table for supporting a workpiece for rotation about the center column to an indexed position beneath the work station, comprising the steps of:

mounting a one-piece annular first manifold ring around the center column, and connecting the first manifold ring to the work table such that the work table and the first manifold ring are indexed together about the center column;

mounting a one-piece annular second manifold ring around the center column so as to be fixed thereto, and telescopically overlapping the first manifold ring to form an annular fluid manifold passage between the first manifold ring and the second manifold ring;

the first ring having an outlet port and internal passage means fluidly connecting the manifold passage to said outlet port;

the second ring having an Inlet port and internal passage means fluidly connecting the manifold passage to the inlet port;

passing pressurized fluid to the inlet port in the second ring to the outlet port in the first ring to a work piece fixture mounted on the work table.

* * * * *